United States Patent
Fischer (10) Patent No.: US 10,727,740 B1
(45) Date of Patent: Jul. 28, 2020

(54) REMOTE LOAD CONDUCTION LOSS COMPENSATION APPLIANCE FOR CELL SITE EQUIPMENT SHELTERS AND REMOTE RADIO UNITS

(71) Applicant: T-Mobile USA, Inc., Bellevue, WA (US)

(72) Inventor: Steve Fischer, Fort Collins, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/370,332

(22) Filed: Mar. 29, 2019

(51) Int. Cl.
| *H02M 3/155* | (2006.01) |
| *H04W 24/04* | (2009.01) |
| *H02J 9/06* | (2006.01) |
| *H04W 88/08* | (2009.01) |

(52) U.S. Cl.
CPC ............ *H02M 3/155* (2013.01); *H02J 9/061* (2013.01); *H04W 24/04* (2013.01); *H04W 88/085* (2013.01)

(58) Field of Classification Search
CPC .. H02M 3/155; H02M 2001/007; H02J 9/061; H02J 50/00; H02J 50/05; H02J 50/10; H02J 50/12; H02J 50/20; H02J 50/23; H02J 50/30; H02J 50/40; H04W 24/04; H04W 88/085; H04W 88/08; H04W 4/80
USPC ........................................................ 455/424
See application file for complete search history.

(56) References Cited

U.S. PATENT DOCUMENTS

| 5,845,190 | A | * | 12/1998 | Bushue | ..................... | H04B 3/00 |
| | | | | | | 725/130 |
| 10,405,223 | B1 | * | 9/2019 | Douberley | ............ | H04W 24/10 |
| 2011/0101884 | A1 | * | 5/2011 | Kim | ..................... | H02M 3/155 |
| | | | | | | 315/294 |
| 2011/0140683 | A1 | * | 6/2011 | Zilberberg | ................ | H02J 9/06 |
| | | | | | | 323/311 |
| 2011/0163599 | A1 | * | 7/2011 | Leu | ........................ | H02M 3/155 |
| | | | | | | 307/31 |
| 2013/0286848 | A1 | * | 10/2013 | Xu | ..................... | H04W 52/0209 |
| | | | | | | 370/241 |
| 2014/0155122 | A1 | * | 6/2014 | Okazaki | ............... | H04B 1/0475 |
| | | | | | | 455/561 |
| 2015/0234399 | A1 | * | 8/2015 | Chamberlain | ......... | H02H 9/045 |
| | | | | | | 455/561 |
| 2015/0326317 | A1 | * | 11/2015 | Michaelis | ............ | H04B 10/807 |
| | | | | | | 398/115 |
| 2017/0317717 | A1 | * | 11/2017 | Trojer | ...................... | H04B 3/46 |
| 2017/0331326 | A1 | * | 11/2017 | Hanley | ................... | H04B 3/44 |
| 2018/0131440 | A1 | * | 5/2018 | Patel | ....................... | H04B 1/38 |

(Continued)

*Primary Examiner* — Nathan S Taylor
(74) *Attorney, Agent, or Firm* — Brownstein Hyatt Farber Schreck, LLP (57) ABSTRACT

A power appliance for a cell site is described. In particular, the appliance is a remote load loss compensator that boosts a voltage output from a power appliance housed in an equipment shelter of a cell site to a level suitable to compensate for conduction losses through a power supply line that feeds power output from the equipment shelter to one or more remote loads, such as a remote radio unit mounted atop an elevated structure. The remote load loss compensator includes a voltage converter and a controller configured to set an output voltage of the voltage converter to a level suitable to compensate for conduction losses in the power supply line.

19 Claims, 6 Drawing Sheets

(56) References Cited

U.S. PATENT DOCUMENTS

2018/0164355 A1\* 6/2018 Winkler ................ G01R 27/08
2019/0274105 A1\* 9/2019 Papa .................... H04W 52/34

\* cited by examiner

REMOTE LOAD CONDUCTION LOSS COMPENSATION APPLIANCE FOR CELL SITE EQUIPMENT SHELTERS AND REMOTE RADIO UNITS

FIELD

Embodiments described herein relate to power delivery and regulation systems for cell sites and, in particular, to systems and methods for compensating, in real time, for conduction losses in power supply lines feeding power to remote radio units from cell site equipment shelters.

BACKGROUND

A cellular service provider, also referred to as a "carrier," typically operates a number of telecommunication transceiver radio sites ("cell sites") distributed throughout a geographic region to provide wireless data and/or voice communications service(s) to end-user equipment (e.g., cellular phones, cellular modems, and the like; typically referred to as "user equipment" or "UE") in that region and associated with a subscriber to the carrier's service(s).

Conventionally, each cell site operated by a carrier includes an equipment shelter housing baseband appliance(s) that communicably couples one or more remote radio units mounted at the top of an elevated structure (e.g., a cellular tower) to a backhaul network. Additionally, power appliance(s) in the equipment shelter feeds electrical power to each of the remote radio units. In conventional installations, a single run of "hybrid" cable that integrates both fiber optic cabling for transacting data and low voltage conductive cabling for feeding power can be used to couple power equipment to each of the remote radio units.

However, conduction losses through a hybrid cable—or any other power supply line or cable—can result in a voltage drop that triggers a low-voltage shutoff condition for one or more of the remote radio units, thereby interrupting cellular service(s) provided by the carrier.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Embodiments described herein are directed to systems and methods for compensating for conduction losses in power supply lines feeding power from power appliances in a cell site equipment shelter to remote radio units. In particular, in many embodiments, a remote load loss compensation appliance interposes the power appliances and the remote radio units and is configured to boost voltage output from the power appliances by an amount that equals or exceeds the voltage drop of the power supply line.

Embodiments described herein are directed to a cell site including a power source with a voltage output. The cell site also includes a remote load loss compensator coupled to output of the power source. The remote load loss compensator includes a voltage converter and a controller. The cell site further includes a power supply line having a resistance. The power supply line couples an output of the remote load loss compensator with a load. In these embodiments, the controller is configured to boost a voltage output from the power source to a boosted voltage by a voltage magnitude greater than, or equal to, a voltage drop resulting from the resistance of the power supply line.

Some embodiments described herein are directed to a remote load loss compensator for installation in an equipment shelter of a cell site. The remote load loss compensator includes an input conductively coupled to a power supply, and a voltage converter conductively coupled to the input. In addition, the remote load loss compensator is configured to output a boosted voltage to feed power to a remote load via a power supply line. The remote load loss compensator further includes a controller in communication with the voltage converter and that is configured to maintain the boosted voltage at a voltage magnitude greater than, or equal to, the sum of (1) the input voltage received at the input and (2) a voltage drop resulting from conduction loss in the power supply line. In addition, the controller is configured to, in response to an instruction to power cycle the remote load, power cycle the remote load by terminating the boosted voltage output for a timeout period.

Some embodiments described herein are directed to a method of operating a remote load loss compensator for installation in an equipment shelter of a cell site, the method including the operations of: determining a characteristic of a power supply line conductively coupling the remote load loss compensator and a remote radio unit; determining a voltage drop across the power supply line based on the characteristic; and applying a voltage to the power supply line to feed power to the remote radio unit, the voltage boosted by an amount greater than or equal to the determined voltage drop.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Embodiments described herein are directed to systems and methods for providing real time compensation for conduction losses imparted by long-run power supply lines feeding low voltage electrical power from one or more power appliances housed in a cell site equipment shelter to a remote radio unit, also referred to as a remote radio head.

In particular, embodiments described herein are directed to cell sites that include a remote load loss compensator that maintains a voltage output from power appliance(s) (e.g., voltage regulator, rectifier, alternating to direct current converter, and so on) in an equipment shelter of the cell site at a level boosted by an amount that compensates for predicted conduction loss based on, without limitation, preset or dynamically-adjusted settings that correspond to one or more of: a gauge of one or more conductors coupled to the power output of the power appliance(s) and feeding power to one or more remote radio units; a metal, alloy, or combination of metals or alloys of one or more conductors coupled to the power output of the power appliance(s) and feeding power to one or more remote radio units; a temperature of the equipment shelter, the power appliance(s), and/or one or more of the remote radio units; a length of cable feeding power to the one or more remote radio units as measured from the equipment shelter of the cell site; a height of a structure (e.g., cellular tower, rooftop, and so on) elevating the remote radio units into a service position; and so on.

For example, in one embodiment, a power appliance of a cell site receives commercial power from a utility and converts (via synchronous or asynchronous rectification or any other suitable alternating to direct current power conversion technique) the alternating current power received from the utility to positive ground low voltage direct current (e.g., negative 48 volts).

The direct current output from the power appliance is connected to a power supply line—which can be a portion of a hybrid cable that also includes fiber optic cabling or strands—that, in turn, feeds power to a remote radio unit. In an example implementation, the power supply line may be dozens of meters in length. As a result of the length of the power supply line, the gauge of the conductors within the power supply line, and/or the current temperature of the power supply line, the resistance of the power supply line can change which, in turn, changes the voltage received by the remote radio unit by a quantity directly proportional to the voltage drop. As such, if power provided by the utility drops (e.g., a brownout condition) below a certain level, the resistance of the power supply line may cause the voltage received by remote radio unit to drop below a shutoff value, triggering a low voltage shutoff condition for the remote radio unit.

To prevent a low voltage shutoff condition from interrupting service(s) provided by the remote radio unit, the equipment shelter of this embodiment further includes a remote load loss compensator appliance that interposes the positive ground direct current output from the power appliance and the power supply line feeding power to the remote radio unit. In this embodiment, the remote load loss compensator appliance, or more simply, the "remote load loss compensator," includes one or more step-up voltage converters that can increase the voltage output from the power appliance by an amount approximating or exceeding the voltage drop caused by the resistance of the power supply line.

For example, if the resistance of the power supply line causes a 5-volt drop from the power appliance to the remote radio unit, the remote load loss compensator can be configured to increase the voltage output from the power appliance, and fed to the remote radio unit, by at least 5 volts. As such, once the boosted voltage output from the remote load loss compensator is reduced by the resistance of the power supply line(s), the voltage received by the remote radio unit is sufficient to prevent a low voltage shutoff condition.

As a result of this construction, as the utility delivers power—regardless the voltage at which that power is provided—the remote load loss compensator regulates voltage output to the remote radio units by boosting voltage output from the power appliance to a level that compensates for conduction losses through the power supply line.

In further embodiments, a cell site may, in addition to a primary power appliance (e.g., configured to receive commercial power from a utility), include a backup power appliance configured to store or generate electrical power if power output from the primary power appliance is insufficient (e.g., blackout or brownout condition). For example, the cell site can include an internal combustion generator with a supply of fuel (e.g., a diesel or natural gas or electric generator coupled to a natural gas utility line or to a fuel tank) and/or a battery or supercapacitor bank. In these examples, as with commercial power, if power provided by the backup power generation or storage system drops below a certain level, the resistance of the power supply line may cause the voltage received by the remote radio unit to drop below a shutoff value, triggering a low voltage shutoff condition for the remote radio unit.

To prevent a low voltage shutoff condition from interrupting service(s) provided by the remote radio unit, the cell site includes a remote load loss compensator, such as described above, that includes one or more step-up voltage converters that can increase the voltage output from the primary and/or backup power appliance(s) by an amount approximating or exceeding the voltage drop caused by the resistance of the power supply line. As a result of this construction, as the backup power generation or storage system delivers power—regardless the voltage at which that power is provided—the remote load loss compensator regulates voltage output to the remote radio units by boosting voltage output from the primary and/or backup power appliance(s) to a level that compensates for conduction losses through the power supply line.

More generally and broadly, a remote load loss compensator, such as described herein, can be configured in a number of suitable ways. In many embodiments, the device includes a number of step-up voltage converters (e.g., boost converters, also referred to as choppers) arranged in parallel and/or series to provide boosted voltage output with sufficient current to provide power to a remote load (e.g., a remote radio unit) coupled to an output of the boost converter(s) by a long run of power supply line.

In many embodiments, the remote load loss compensator includes a controller—which may be implemented in software or may be implemented as, or may include, a processor, analog circuitry, digital circuitry, memory, storage, databases, or any combination thereof—configured to set and/or maintain the output voltage of the step-up voltage converter(s) of the remote load loss compensator at a particular voltage level. For example, the controller can be configured to maintain the output voltage of a step-up voltage converter based on, without limitation, preset or dynamically-adjusted settings stored in a memory (e.g., non-volatile memory, DIP switches, jumper settings, and so on) that correspond to one or more of: a gauge of one or more conductors coupled to the power output of a primary or backup power appliance and feeding power to one or more remote radio units; a metal, alloy, or combination of metals or alloys of one or more conductors coupled to the power output of the a primary or backup power appliance and feeding power to one or more remote radio units; a temperature of the equipment shelter, a primary or backup power appliance, and/or of one or more of the remote radio units; a length of cable feeding power to the one or more remote radio units as measured from the equipment shelter of the cell site; a height of a structure (e.g., cellular tower, rooftop, and so on) elevating the remote radio units into a service position; and so on. In some embodiments, two or more of the preceding example properties can be recorded and/or saved in a settings file or profile that is accessed by the controller. After accessing the settings file, the controller can set and/or maintain the output voltage of the step-up voltage converter(s) of the remote load loss compensator.

For example, a settings file or profile may inform the controller of the remote load loss compensator that a power supply line coupled to an output of the remote load loss compensator is 50 m in length, made from stranded copper cabling, and is 14 AWG. The settings file or profile may further include information to inform the remote load loss compensator that a remote radio unit coupled to the power supply line is configured to consume 300 W of power.

Based on these values, the controller of the remote load loss compensator can model the complete power supply line circuit as three series resistors. A first series resistor corresponds to the resistance of the positive ground reference, a second series resistor corresponds to the power consumption of the remote radio unit, and a third series resistor corresponds to the resistance of the negative voltage supply. Leveraging this model, the remote load loss compensator can use known resistivity of copper, the cross-sectional area of 14 AWG copper wire (e.g., roughly 2 mm2), and a run length of 50 m, to determine that the expected resistance of the first series resistor and the third series resistor of the model is approximately 0.41Ω.

Next, the remote load loss compensator determines that if the remote radio unit consumes 300 W of power supplied at, ideally, −48V, then roughly 6.25 A of current circulate through the model schematic.

Leveraging Ampere's law, the remote load loss compensator can calculate that the first and third series resistors each cause a voltage drop of roughly 2.56V. Summing these two resistances, the remote load loss compensator can predict that the voltage across the second series resistor (e.g., the voltage supplied to the remote radio unit) is approximately 5.13V. In other words, the remote load loss compensator determines that the remote radio unit receives power supplied at −42.9V.

In response to this determination, the remote load loss compensator can set the output voltage of the step-up voltage converters to be −(48V+5.13V), or −53.13V. Following the modeling exercise presented above, it may be appreciated that the voltage drop across each of the first and third series resistors remains at roughly 2.56V, presuming that current through the remote radio unit is substantially constant (which, as may be appreciated is an abstraction that may not be accurate in all circumstances). In addition, it may be appreciated that, as a function of the boosted voltage, the voltage across the remote radio unit has been increased in magnitude to, and maintained, at approximately −48V.

In another example, a settings file or profile may inform the controller of the remote load loss compensator that a power supply line coupled to an output of the remote load loss compensator is 50 m in length, made from stranded aluminum cabling, and is 14 AWG. As with the example provided above, the settings file or profile may further include information to inform the remote load loss compensator that a remote radio unit coupled to the power supply line is configured to consume 300 W of power.

In this example, as with the preceding example, the remote load loss compensator can utilize the known resistivity of aluminum, the cross section of the cable, and the expected power consumption of the remote radio unit to determine that a voltage drop of approximately 8V is expected through the run of power supply line. As such, the controller of the remote load loss compensator can be configured to increase the absolute value of the voltage output from the equipment shelter (e.g., output from a primary or backup power appliance) by approximately 8V to −56V.

It may be appreciated that the foregoing examples are not exhaustive of the properties or values that may be included in a settings file or profile such as described herein or, additionally or alternatively, used by a controller of a remote load loss compensator to set a boosted voltage value that compensates for voltage drop across a run of power supply line communicably and/or conductively coupling a cell site primary or backup power appliance to a remote radio unit. Example variables, values, or properties that may be used by a controller to inform what value of boosted voltage to select can include, but are not limited to: equipment shelter temperature; remote radio unit temperature; power supply line gauge; power supply line run length; power supply line connector type; power supply line material; power supply line condition; a fixed direct current bias value; power supply line conduit type; backhaul characteristics (e.g., traffic, latency, congestion and the like); expected or predicted weather conditions; and so on.

In view of the foregoing examples, it may be appreciated that, generally and broadly, a remote load loss compensator such as described herein can be suitably configured in a number of ways to estimate, predict, determine, or calculate an expected voltage drop due to a power supply line and, thereafter, boost voltage output from a primary or backup power appliance to account for that estimated, predicted, determined, or calculated voltage drop. In this manner, the remote load loss compensator can provide a remote radio unit with adequate voltage to prevent a low voltage shutoff condition, thereby improving service continuity for the carrier.

In addition, the remote load loss compensator can be communicably coupled to a central server or service (e.g., via the backhaul network or another suitable network or failover) that can communicate a signal to the remote load loss compensator to remotely power cycle one or more remote radio units, which may be helpful for a carrier to troubleshoot and/or fix service outages. More specifically, the remote load loss compensator can also be used to interrupt power output from the primary or backup power appliance.

In addition, the remote load loss compensator may be particularly useful for cell sites that include a backup power generation or storage system. For example, in conventional installations, a battery backup system may be configured to deliver power at approximately −48V. In these examples, it may be appreciated that conduction losses in the power supply line may drop the voltage supplied to a remote radio unit below a threshold at which a low-voltage shutoff condition is triggered. In other words, a remote radio unit that is powered from a battery backup system may not fully exhaust the battery power before a low voltage shutoff condition is triggered. For embodiments described herein, the remote load loss compensator ensures that voltage output from the battery backup system is sufficiently boosted to deliver usable power to the remote radio unit regardless the output voltage of that battery backup system. In other words, for embodiments described herein, the remote load loss compensator enables a battery backup system to be fully depleted before triggering a low-voltage shutoff condition. In this manner, the remote load loss compensator dramatically improves the duration of service that can be provided by a cell site operating on battery backup power. This, in turn, can result in dramatic improvements in service continuity, as the additional hours of service enabled by the remote load loss compensator can provide a carrier and/or a utility with valuable time that can be used to restore access to commercial power.

In addition, the remote load loss compensator may be useful to a carrier seeking to upgrade remote radio unit(s) at a cell site to higher power units without requiring new power supply lines or hybrid cabling to be run. In other words, a carrier maintenance or upgrade technician or service professional may simply replace a radio unit unit and update a settings file or profile or other configuration of the remote load loss compensator housed in the equipment shelter of that cell site. As such, a remote load loss compensator—such as described herein—can dramatically increase the speed with which a cell site is upgraded to support new technology or protocols and/or dramatically decrease the cost of upgrading a cellular network of multiple cell sites.

These and other embodiments are discussed below with reference to FIGS. 1-5. However, those skilled in the art will readily appreciate that the detailed description given herein with respect to these figures is for explanatory purposes only and should not be construed as limiting.

Figure 1:
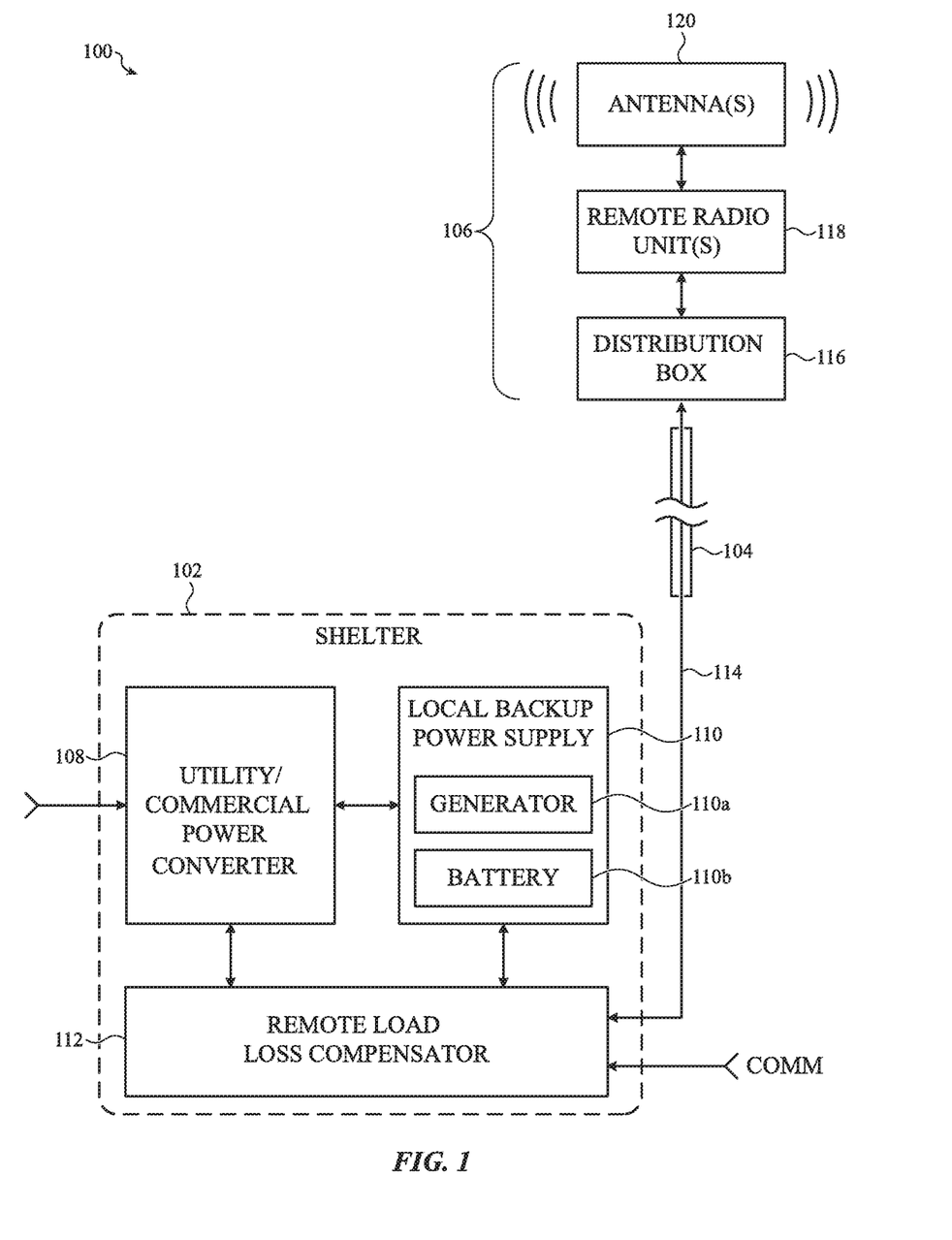
FIG. 1 depicts a simplified system diagram of a cell site including a remote load loss compensator, such as described herein.

Generally and broadly, FIG. 1 depicts an example simplified system diagram of a cell site that may be operated by a cellular telecommunications carrier. As noted above and with respect to other embodiments described herein, the cell site can include an equipment shelter housing communications and power appliances that communicably and conductively coupled to a remote radio unit that, in turn, can be coupled to one or more antennas. Typically, the remote radio unit(s) and antennas are mounted at the top of an elevated structure such as a cellular tower (e.g., a monopole, a lattice tower, a guyed tower, a stealth tower, and the like) or a building rooftop. The remote radio unit(s) and antennas are coupled to the appliances housed in the equipment shelter via appropriate cabling which, as noted above, may be a single run of hybrid cable in a shielded or unshielded conduit that communicably and conductively couples the remote radio unit(s) and antennas to appliances within the equipment shelter, which may be protected in an equipment shelter or, in other cases, may be outside an equipment shelter.

Although it may be appreciated that many embodiments described herein reference hybrid cabling, this is not a requirement and multiple discrete cables can be used. For example, in some installations, communication(s) cabling may not be required; a cell site can communicably couple to a backhaul network via wireless infrastructure as well (e.g., microwave links). For simplicity of description, the various example means by which a backhaul network can communicably couple to a remote radio unit of a cell site are not described herein; it may be appreciated that any number of suitable means of communicably coupling a backhaul network to a remote radio unit can be used, some of which include baseband networking equipment and/or other communications appliances protected in an equipment shelter of a cell site. As such, the embodiments that follow reference power supply lines that may be used to conductively couple a power output of a power appliance housed in, or nearby, a cell site equipment shelter with a power input of a remote radio unit.

More particularly, FIG. 1 depicts a simplified system diagram of a cell site 100 that includes an equipment shelter 102 that includes one or more power appliances configured to supply electrical power through a power supply line 104 to drive a remote load 106.

As with other embodiments described herein, the equipment shelter 102 of the cell site 100 typically receives alternating current power from a commercial utility. To convert the power received from the utility into direct current that can be fed via the power supply line 104 to the remote load 106, the equipment shelter 102 includes a commercial power converter 108 (e.g., a primary power appliance).

The commercial power converter 108 can include one or more rectifiers, switch-mode power supplies, or other voltage converters. It may be appreciated that any number of suitable techniques for converting alternating current received from a commercial utility into direct current can be used.

As with other embodiments described herein, the commercial power converter 108 may be configured to output positive ground direct current power at −48V. Positive ground voltage may be selected to prevent corrosion and/or for compliance with existing telecommunication infrastructure. However, it may be appreciated that this is merely one example and any suitable voltage range or magnitude may be output from the commercial power converter 108.

In some cases, the commercial power converter 108 further includes one or more processors, memory, long-term storage, and/or network communication interfaces. The processor(s) of the commercial power converter 108 can communicably couple to any number of other components in order to perform, monitor, and/or coordinate one or more tasks or operations of the commercial power converter 108. For example, in some embodiments, the processor of the commercial power converter 108 is configured to leverage a network communication interface to access or otherwise couple to a remote server or service that may be operated and/or hosted by the carrier or another entity. As a result of this network connection, the carrier or a host service of the carrier can send one or more instructions to the commercial power converter 108 to change one or more operations of the commercial power converter 108. Example instructions or signals that can be received by the commercial power converter 108 include, but are not limited to: an instruction to increase output power; an instruction to cycle output power; an instruction to send or forward one or more logs; an instruction to enter a standby state; and the like.

Similarly, the commercial power converter 108 can periodically or regularly send one or more signals or instructions to one or more remote services, such as the host service discussed above. Example signals or data or information that can be transmitted from the commercial power converter 108 include, but are not limited to: status information; power consumption information; power use information; power outage information; voltage and/or current information; and so on.

In still further examples, the commercial power converter 108 can be configured to communicably couple to one or more other systems, appliances, or subsystems housed in the equipment shelter 102. For example, without limitation, the commercial power converter 108 can be configured to communicably couple to and/or transact data or information with one or more of: a backhaul network appliance; an auxiliary power controller or converter; a failover network appliance; and the like.

It may be appreciated that the foregoing examples are not exhaustive of the possible configurations, features, or architectures of a commercial power converter 108, such as described herein; the commercial power converter 108 can be configured in any suitable manner to convert power received from a utility into power usable by other systems or subsystems housed in the equipment shelter 102, including the remote load 106.

In some embodiments, the equipment shelter 102 can optionally include a local backup power supply 110 (e.g., a backup or secondary power appliance) as a backup to the commercial power received by the commercial power converter 108.

The local backup power supply 110 can be suitably configured to provide power output to the remote load 106 when power output from the commercial power converter 108 fails or otherwise falls below a selected threshold. In some embodiments, the local backup power supply 110 operates contemporaneously with the commercial power converter 108, but this is not required of all embodiments.

The local backup power supply 110 can be configured in a number of suitable ways. For example, the local backup power supply 110 can include a combustion generator 110*a* that is coupled to a fuel source (not shown). In other embodiments, the local backup power supply 110 can include a battery bank or array 110*b*. In still further examples, the local backup power supply 110 can include one or more of, without limitation: a solar panel array; a supercapacitor bank; a flywheel generator; and the like. It may be appreciated that these examples are not exhaustive of the possible configurations of a local backup power supply 110; many alternatives are possible and will be readily understood by a person of skill in the art.

As noted with respect to other embodiments described herein, the equipment shelter 102 further includes a remote load loss compensator 112 that is coupled to the output(s) of the local backup power supply 110 and the commercial power converter 108. The remote load loss compensator 112 includes one or more step-up voltage converters and/or one or more voltage regulators configured to provide a substantially constant output voltage. Example step-up voltage converters include, but are not limited to: boost converters; buck-boost converters; transformers; switch-mode power supplies; and the like.

As a result of this construction and architecture, voltage output from the local backup power supply 110 and the commercial power converter 108 can be boosted by an amount that compensates for, or exceeds, the voltage drop that results from conduction losses within the power supply line 104 and, more specifically, from conduction losses in the conductors 114 of the power supply line 104 that conductively couple voltage output from the remote load loss compensator 112 to the remote load 106 which, more specifically, can include a distribution box 116 (to distribute signals and/or power to one or more components mounted at the top of the elevated structure), a remote radio unit 118, and an antenna 120.

As noted with respect to other embodiments described herein, the remote load loss compensator 112 is configured to ensure that fluctuations in voltage output from either or both the local backup power supply 110 or the commercial power converter 108 do not result in a low voltage shutoff condition for the distribution box 116 or the remote radio unit 118.

More specifically, the remote load loss compensator 112 is configured to maintain a level of output voltage fed into the conductors 114 of the power supply line 104 such that voltage received by the various components of the remote load 106 remains substantially constant and within a specified range.

The remote load loss compensator 112 performs this operation by first regulating voltage output of one or more power sources or appliances associated with the equipment shelter 102. In addition, as noted with respect to other embodiments described herein, the remote load loss compensator 112 is configured to boost voltage output from the one or more power sources or appliances, whether primary or secondary, associated with the equipment shelter 102 to a level that compensates for conduction losses through the conductors 114 of the power supply line 104.

The remote load loss compensator 112 can select the amount of boost to provide in a number of suitable ways. For example, in one embodiment, a controller or other processor of the remote load loss compensator 112 can be configured to access a configuration file, a settings file, or other profile (collectively, a "file") stored in a memory of the remote load loss compensator 112 or otherwise accessible to the remote load loss compensator 112 in order to determine an amount of boosted voltage to provide. The file can be stored in any suitable form or format and/or may be accessed, decoded, decrypted, or inflated in any suitable manner.

In this manner, for these embodiments, the file can inform the remote load loss compensator 112 to provide a fixed boost of 10V. In other cases, the configuration file, settings file, or other profile can inform the remote load loss compensator 112 to provide a fixed output voltage that is greater than the voltage required by one or more components of the remote load 106. For example, if the remote radio unit 118 requires −48V, the fixed output voltage output by the remote load loss compensator 112 may be equal to −58V. It may be appreciated that these examples are not exhaustive and that any suitable fixed offset or fixed output voltage can be provided by the remote load loss compensator 112.

In another embodiment, the file can store other content or values that can be used by the remote load loss compensator 112 to calculate, estimate, or otherwise determine an amount of boost that should be provided. For example, as noted above, the remote load loss compensator 112 can be configured to calculate an approximate resistance of the conductors 114 of the power supply line 104. This operation can be informed by data or information about the conductors 114 and/or the power supply line 104 stored in the file. For example, the file can include, without limitation: a metal type of the conductor 114; a gauge of the conductor 114; an indication of whether the conductors 114 are stranded or solid; an insulation or shielding type of the power supply line 104; a length of the power supply line 104; a temperature of the power supply line 104; a resistivity of the power supply line 104 and/or the conductor 114; a maximum operating current rating for the power supply line 104; a time in service estimation for power supply line 104; a corrosion estimation for power supply line 104; a supplier or vendor that installed the power supply line 104; and the like and so on. More generally and broadly, the file accessed by the remote load loss compensator 112 can include any suitable information about the power supply line 104 that may impact or otherwise influence the electrical resistance thereof.

In these embodiments, the remote load loss compensator 112 can determine an estimated boost value based on calculations or other determinations made based on information contained in the file. The remote load loss compensator 112 may use all information contained in the file or may use only a subset of information contained in the file.

In some cases, the remote load loss compensator 112 can use information in the file to access further information, such as a value in a database or a lookup table. For example, the file may indicate that the conductor 114 is stranded copper of a particular gauge. With this information, the remote load loss compensator 112 can access a lookup table containing precomputed values that correspond to resistance per unit length of such a cable. Thereafter, the remote load loss compensator 112 can determine the resistance of the power supply line 106 by calculating the product of the resistance per unit length obtained from the lookup table and a known length of the power supply line 104.

In still further examples, the remote load loss compensator 112 can be configured to access a remote database that contains information about the cellular site 100. Such information may include, without limitation; a length of the power supply line 104; a date of installation of the power supply line 104; a wire gauge of the power supply line 104; a metal type of the conductor 114; and so on.

In view of the foregoing, generally and broadly, it is appreciated that independent of the source of information consumed by the remote load loss compensator 112, whether from the file, a DIP switch array or other physical input device, or a remote resource (which may be accessed through the open Internet, a private network, and/or the backhaul network), it may be appreciated that the remote load loss compensator 112 can utilize that information in a number of ways in order to determine an appropriate amount of boost voltage to provide an appropriate level at which to maintain output voltage of the remote load loss compensator 112. Examples include, but are not limited to: leveraging Ampere's law to calculate or estimate resistance; leveraging a resistivity table to determine an estimated resistance of a section or entirety of the power supply line 104; using an input value provided by an operator of the remote load loss compensator 112 to set a quantity of boost to provide and/or a voltage value to be maintained and so on.

It may be appreciated that the foregoing examples are not exhaustive; in other embodiments, the remote load loss compensator 112 can be configured to determine an amount of boost voltage to provide using any other suitable technique.

It may be appreciated that the foregoing description of FIG. 1, and the various alternatives thereof and variations thereto, are presented, generally, for purposes of explanation, and to facilitate a thorough understanding of various possible configurations of a cell site including a remote load loss compensator, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 2:
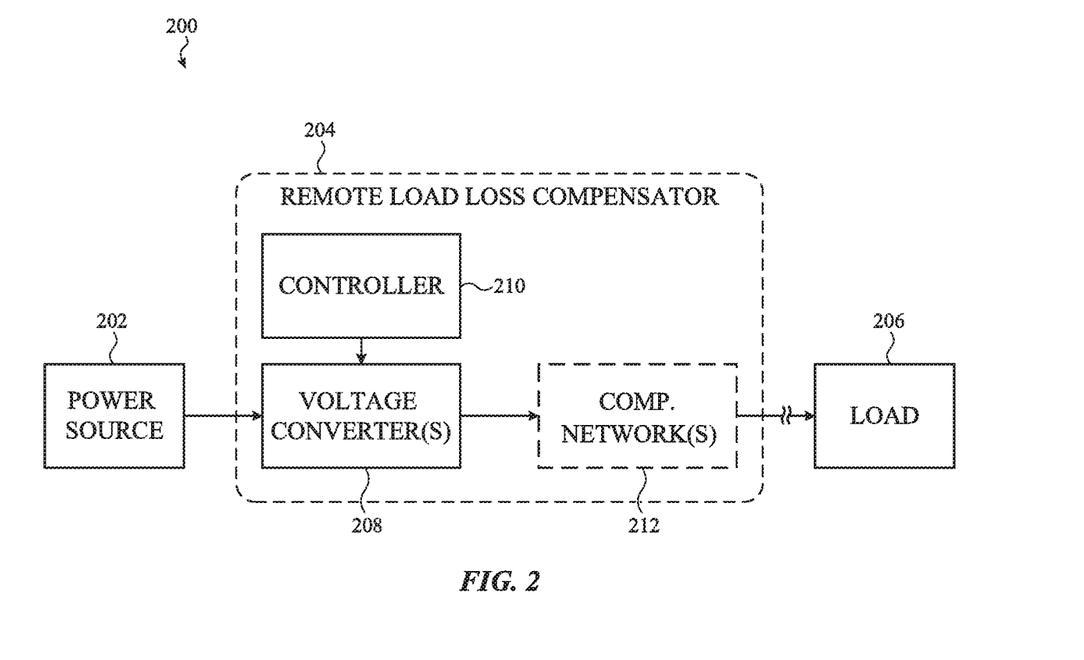
FIG. 2 depicts a simplified diagram of a system including a remote load loss compensator, such as described herein.

Generally and broadly, FIGS. 2 and 3A-3C depict simplified schematic and/or system diagrams of a remote load loss compensator, such as described herein. As noted with respect to other embodiments described herein, including the cell site system diagram described in reference to FIG. 1, the remote load loss compensator(s) described in reference to these figures typically include at least one step-up voltage converter. These figures are described in reference to a boost converter as one example step-up voltage converter, however it may be appreciated that this is merely one example circuit topology and that other circuits or combinations thereof are possible For example, FIG. 2 depicts a simplified diagram of a system including a remote load loss compensator, such as described herein. The system 200 includes a power source 202, a remote load loss compensator 204, and a remote load 206. A direct current voltage output of the power source 202 is coupled to a direct current voltage input of the remote load loss compensator 204. Similarly, a direct current voltage output of the remote load loss compensator 204 is coupled to a voltage input of the remote load 206 via a power supply line that separates the remote load loss compensator 204 and the remote load 206 by an arbitrary fixed distance that exhibits conduction loss.

In other words, the direct current voltage received by the remote load 206 is understood to be less than the direct current voltage output from the power source 202 (typically a positive ground voltage with a rail of −48V, although any suitable value can be used).

As with other embodiments described herein, it is understood that the power source 202 can be any suitable cell site equipment shelter power source or appliance, such as a commercial utility, a generator output, and/or a battery backup system. Similarly, it is understood that the remote load 206 can be any suitable remote load that is powered (indirectly) by the power source 202 such as one or more remote radio units. For simplicity of description and illustration, the various possible types of the power source 202 and the remote load 206 are abstracted to the simplified boxes depicted in FIG. 2; it is understood, however, that these are merely generalized examples and that specific implementations can include a number of suitable power sources and/or remote loads.

In this embodiment, as with others described herein, the remote load loss compensator 204 interposes the power source 202 and the remote load 206. In other words, the power source 202, the remote load loss compensator 204, and the remote load 206 are coupled in a series electrical circuit. In this manner, and as a result of this construction, the remote load loss compensator 204 can regulate and/or boost the direct current voltage output from the power source 202 to a value that compensates for conduction losses that are exhibited by the power supply line coupling the direct current voltage output of the remote load loss compensator 204 to the direct current voltage input of the remote load 206.

In one example, if the expected or calculated conduction loss is 5V, and the direct current voltage output from the power source 202 is, under normal operating conditions, −48V, then the remote load loss compensator 204 may be configured to output a regulated −53V, substantially independent of fluctuations in direct current output from the power source 202. In other words, in response to a drop in voltage output from the power source 202, the remote load loss compensator 204 can be configured to automatically increase voltage output in order to compensate for the drop.

As one specific example, continuing the example presented above, if voltage output from the power source 202 drops to −40V, the remote load loss compensator 204 may automatically increase that voltage by −13V such that the direct current voltage output from the remote load loss compensator 204 maintains a magnitude of −53V. Similarly, if voltage output from the power source 202 returns to −48V, the remote load loss compensator 204 may automatically decrease the voltage boost provided to a magnitude of 5V, such that the direct current voltage output from the remote load loss compensator 204 maintains a magnitude of −53V.

In still further examples, if voltage output from the power source 202 increases or spikes to a magnitude of −55V, the remote load loss compensator 204 can be configured to perform one or more operations including, but not limited to: entering a low-power state; entering a pass-through power state in which power output from the power source 202 is not modified or boosted by the remote load loss compensator 204; enter a step-down voltage conversion state in which the direct current voltage output from the power source 202 is decreased by 2V such that the direct current voltage output from the remote load loss compensator 204 maintains a magnitude of −53V; enter a shunt regulation mode to maintain direct current voltage output at −53V; and the like and so on.

To perform these described and other equivalent operations, the remote load loss compensator 204 includes a voltage converter 208, a controller 210, and (optionally) a compensation network 212.

The voltage converter 208 of the remote load loss compensator 204 can be configured and/or implemented in a number of suitable ways. For example, the voltage converter 208 can be implemented as, or may include, a boost converter. In other cases, the voltage converter 208 can be implemented as, or may include, a buck-boost converter. In still other cases, the voltage converter 208 can be implemented as, or may include, a buck converter, a shunt regulator, an inverter-transformer-rectifier voltage converter, and the like. It may be appreciated that the foregoing examples are not exhaustive; any suitable circuit topology can be used to implement a voltage converter such as described herein.

The controller 210 of the remote load loss compensator 204 can be implemented in hardware or software and may include or may be communicatively coupled to one or more of, without limitation: processors; logic gates; memory; non-volatile storage; databases; lookup tables; input devices or components; and so on.

In many cases, the controller 210 is configured to control a voltage output of the voltage converter 208. In one example in which the voltage converter 208 is implemented as a boost converter, the controller 210 may be configured to control a duty cycle at which a tank inductor of the boost converter is charged and discharged. As the duty cycle is changed by the controller 210, voltage output by the boost converter increases beyond the direct current voltage output by the power source 202 or decreases back to the direct current voltage output by the power source 202. More specifically, as noted above, the controller 210 is configured to determine, receive, and/or otherwise select a target output voltage to be output from the remote load loss compensator 204 in order to compensate for conduction losses exhibited by the power supply line feeding power output from the remote load loss compensator 204 to the remote load 206. In other words, in these examples, the controller 110 of the remote load loss compensator 204 can be configured to autonomously and/or automatically increase or decrease the duty cycle of the boost converter in order to maintain the selected target output voltage.

As noted above, the remote load loss compensator 204 can optionally include a compensation network 212 that is configured to improve and/or maintain stability of voltage output from the remote load loss compensator 204. In some cases, the compensation network 212 can be an output capacitor coupling the output voltage of the voltage converter 208 to circuit ground, thereby functioning as a low pass filter; the compensation network 212 removes high-frequency noise from the output of the remote load loss compensator 204. In other cases, the compensation network 212 can include an array of capacitors, diodes, and other active elements to further smooth and/or filter frequency content from the voltage output from the voltage converter 208. It may be appreciated by a person of skill in the art that a number of suitable circuit topologies may be suitable and that the foregoing examples are not exhaustive.

Figure 3A:
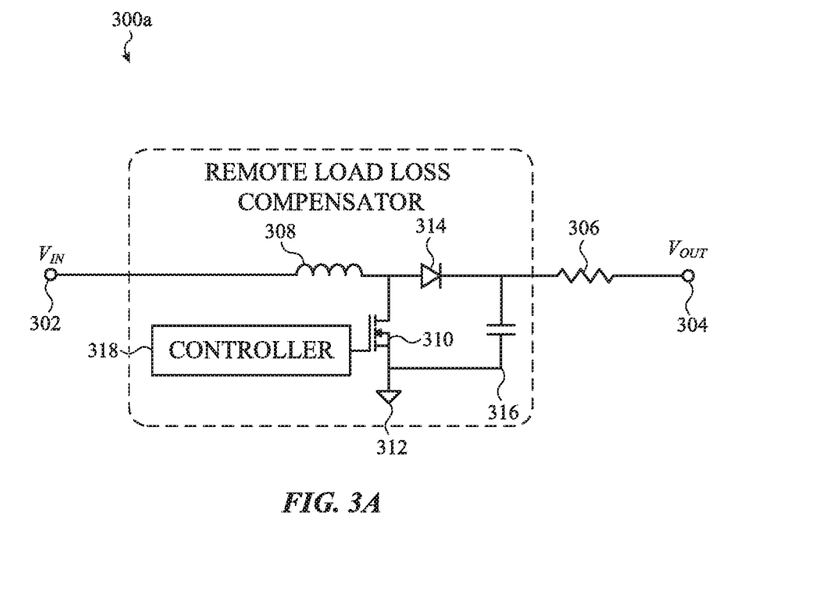
FIG. 3A depicts a simplified schematic of a system including a remote load loss compensator, such as described herein.

As noted above, a remote load loss compensator such as described here is typically included in a cell site equipment shelter to prevent low voltage shutoff conditions from interrupting cellular service at that site. As such, in many embodiments and as noted above, a remote load loss compensator is implemented with a boost converter configured to increase voltage output from a power source to a regulated level suitable to compensate for power line conduction losses. FIG. 3A depicts a simplified schematic of a system 300a including a remote load loss compensator implemented with a boost converter, such as described herein.

More specifically, the system 300a includes an input node 302 and an output node 304, separated by a resistance 306. In this simplified schematic, the input node 302 is understood to correspond to an output voltage provided by a power appliance housed in a cell site equipment shelter (e.g., commercial power, generator power, battery backup system). Similarly, the output node 304 is understood to correspond to an input voltage provided to a remote load, such as a remote radio unit mounted atop an elevated structure. The resistance 306 corresponds to the resistance of the power supply line that couples the input node 302 and the output node 304; the voltage drop across the resistance 306 corresponds to the difference in voltage from the input node 302 and the output node 304.

The system 300a also includes a boost converter in series with the input node 302, the resistance 306, and the output node 304.

The boost converter includes a tank inductor 308 that is selectively coupled by a switching element 310 to a circuit ground 312. More specifically, in a "charging" phase of operation, the switching element 310 is closed and, as a result, the tank inductor 308 completes a path from the input node 302 to circuit ground 312, causing voltage across the tank inductor 308 to drop. In a "discharging" phase of operation, which is configured to follow the charging phase, the switching element 310 is opened, breaking the path connecting the tank inductor 308 to the circuit ground 312.

As a result, a magnetic field generated by the tank inductor 308 during the charging phase begins to collapse, which in turn generates a fly-back voltage (e.g., a voltage spike) that is passed through a blocking diode 314, stored in an output capacitor 318 (which may not be required of all embodiments), and in series with the resistance 306. As this is repeated at a selected duty cycle, the voltage across the tank inductor 308 during the discharge phase is effectively added to the voltage of the input node 302, thereby "boosting" the voltage of the input node 302 by an amount proportional to the duty cycle. By increasing or decreasing the duty cycle, the quantity of boost can be increased or decreased. The boost converter includes a controller 318 coupled to a gate of the switching element 310 to perform this function. The controller 318 may be configured in the same or a similar manner as described above in reference to the controller 210 depicted in FIG. 2 and/or the controller of the remote load loss compensator 112 depicted in FIG. 1 and, as such, this description is not repeated.

Figure 3B:
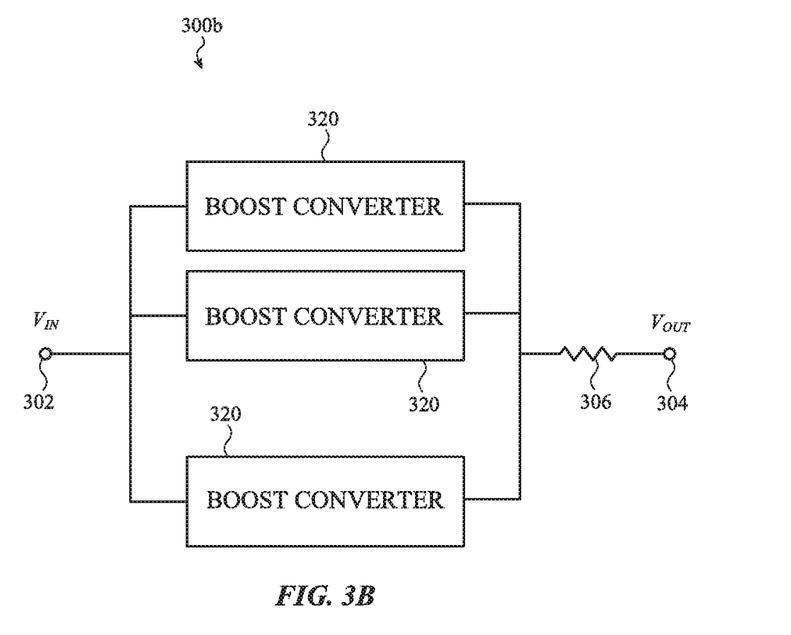
FIG. 3B depicts a simplified diagram of a system including a remote load loss compensator implemented with an array of boost converters coupled in parallel.

In some embodiments, a remote load loss compensator can include more than one boost converter. For example, FIG. 3B depicts a simplified diagram of a system 300b including a remote load loss compensator disposed in series with an input node 302 (e.g., a cell site equipment shelter power supply or other power appliance or power source), an output node 304 (e.g., a remote load, such as a remote radio unit), and a resistance 306 (e.g., representing a resistance of a power supply line feeding power to the output node 304). In this example embodiment, the remote load loss compensator further includes a number of boost converters 320 arranged in parallel. As a result of this circuit topology, increased current can be fed to the output node 304. In other examples, one or more of the boost converters 320 can be selectively activated or deactivated in order to prevent degradation of parts, to improve power efficiency of the remote load loss compensator, or for any other suitable purpose. In other cases, one or more of the boost converters 320 can be coupled in series. For example, FIG. 3C depicts another simplified diagram of a system 300c including a remote load loss compensator implemented with an array of boost converters 320 coupled in series.

Figure 3C:
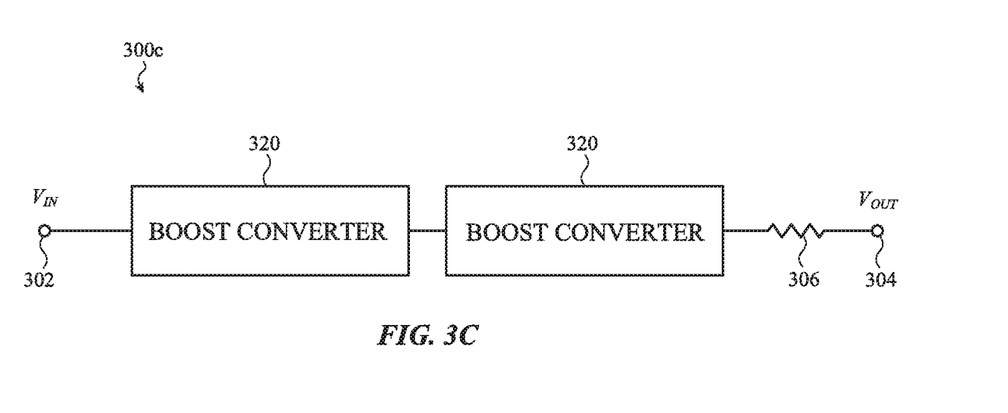
FIG. 3C depicts another simplified diagram of a system including a remote load loss compensator implemented with an array of boost converters coupled in series.

It may be appreciated that the foregoing description of FIGS. 2-3C, and the various alternatives thereof and variations thereto, are presented, generally, for purposes of explanation, and to facilitate a thorough understanding of various possible configurations of a remote load loss compensator, such as described herein. However, it will be apparent to one skilled in the art that some of the specific details presented herein may not be required in order to practice a particular described embodiment, or an equivalent thereof.

For example, although various example simplified circuits are described above, it may be appreciated that any suitable means of boosting voltage may be used. For example, boost converters, boost-buck converters, and buck converters can be used to increase low voltage to a boosted level suitable to overcome conduction losses through a power supply line or, additionally or alternatively, can be used to decrease high voltage (whether alternating or direct current) to a value suitable to overcome conduction losses through a power supply line and suitable to decrease voltage to a level suitable to be received by a remote radio unit.

Similarly, it may be appreciated that any number of circuit topologies and/or compensation networks may be used. In many embodiments, a low-pass output capacitor may be suitable, although in other embodiments a compensation network including capacitors, diodes, and/or other passive or active circuit elements may be used.

In some cases, one or more transformers, inverters, and/or rectifiers may also be used. In other words, in addition to or in place of a voltage regulation circuit, a remote load loss compensator such as described herein can include an alternating current conversion stage. For example, the remote load loss compensator can receive direct current from a power output of a power appliance and can convert that power output into alternating current at a specified frequency, which may be mains current frequency or may be a higher frequency (e.g., in kHz or MHz range). Thereafter, the alternating current can be input to an iron core (or other material) transformer that can, in turn, increase or decrease voltage appropriately based on a ratio of turns from the primary winding of the transformer to the secondary winding of the transformer. Thereafter, a passive or active (e.g., synchronous or asynchronous) rectifier can be used to convert the alternating current back into direct current suitable to feed power to a remote radio unit via a power supply line. In this embodiment, as with other embodiments described herein, the voltage output from rectification may be boosted by an amount suitable to overcome and/or compensate for line losses in the power supply line.

It may be appreciated that the foregoing examples are not exhaustive of the various schematics and circuit topologies that may be used to implement a remote load loss compensator such as described herein.

For example, as noted above, a remote load loss compensator can include a controller, The controller can be any suitable processor and/or digital or analog circuit configured to perform, coordinate, schedule, or monitor one or more operations of the remote load loss compensator.

In further embodiments, the controller of the remote load loss compensator can be further coupled to one or more additional systems of subsystems of the remote load loss compensator. For example, the remote load loss compensator can include one or more of, without limitation: a memory; non-volatile storage; a networking connection; a wireless networking connection; a display; a settings panel; a cooling system (e.g., fans, liquid cooling, and the like); an input switch array (e.g., DIP switch); a jumper pin array; and so on. Although these elements are not depicted in FIGS. 2-3C for simplicity of illustration, it may be appreciated that any suitable combination thereof can be incorporated into a remote load loss compensator such as described herein.

More simply, it may be appreciated that a remote load loss compensator such as described herein can include a housing that encloses a number of suitable components that are communicably and/or conductively coupled to one another in order to perform one or more operations and/or functions described herein.

In many embodiments, the housing of the remote load loss compensator can be sized according to the Rack Unit standard. In other words, the remote load loss compensator may be housed in an enclosure or housing suitable to be mounted in a standard 19 inch or 23 inch server rack. It may be appreciated that this is merely one example and that in other cases, other housing shapes and sizes can be used.

Further still, it may be appreciated that a remote load loss compensator such as described herein can be powered in a number of suitable ways. In many embodiments, the remote load loss compensator can power itself from power received from a power appliance in or nearby the equipment shelter. In other cases, the remote load loss compensator can have a separate internal or external power supply. For example, the remote load loss compensator can include and/or be coupled to, without limitation: a battery; mains power; solar power; wind power; and the like. It may be appreciated that the foregoing are merely examples; any suitable means of powering a remote load loss compensator, such as described herein may be used.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 4:
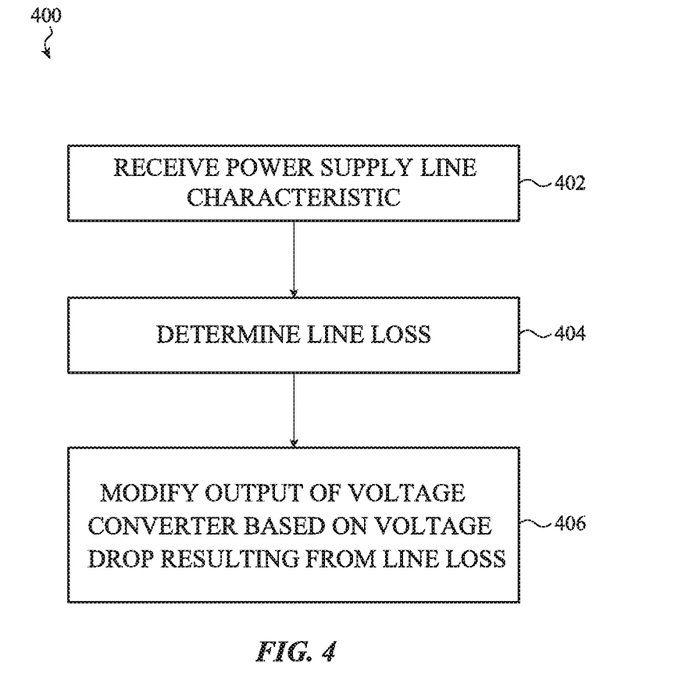
FIG. 4 depicts example operation of a method of operating a remote load loss compensator, such as described herein.
Figure 5:
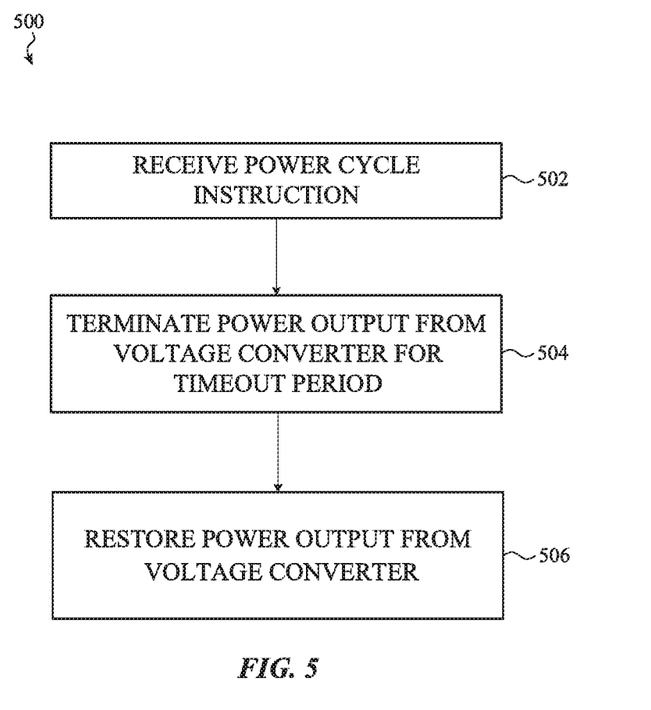
FIG. 5 depicts example operation of a method of power cycling a remote load coupled to a remote load loss compensator, such as described herein.

For example, it may be appreciated that a remote load loss compensator can be operated in a number of suitable ways. FIGS. 4-5 depict example operations of simplified methods of operating a remote load loss compensator, such as described herein.

In particular, FIG. 4 depicts an example operation of a method 400 of operating a remote load loss compensator, such as described herein. The method 400 can be performed, in whole or in part, by a controller such as described herein.

The method 400 includes operation 402 in which a power supply line characteristic is received. As noted with respect to other embodiments described herein, the power supply line characteristic can be obtained from a file, via a request or response from a remote server or service, by direct input to an input component (e.g., keyboard, touchscreen, DIP switch array, dial input, and the like) coupled to the remote load loss compensator, and so on. Similarly, it is appreciated that a number of suitable characteristics can be received. Example characteristics of a power supply line can include, but are not limited to: conductor type (e.g., stranded or solid); conductor metal; conductor twist; conductor length; conductor connector type; conductor age; conductor resistivity; conductor gauge; conductor lifespan; conductor service date; conductor temperature; anticipated conductor temperature or length change due to temperature as a result of predicted weather conditions; and the like and so on.

Upon receiving the characteristic(s) at operation 402, the method 400 advances to operation 404 in which power supply line loss is determined, estimated, or otherwise established based on the characteristic(s) received at operation 402. The loss in the power supply line, as noted above, can be calculated, estimated, or otherwise established in a number of suitable ways including, but not limited to: calculating resistance of the power supply line based on one or more of: gauge, conductor resistivity, conductor metal, conductor length, and the like; calculating a change in resistance of the power supply line based on one or more of: temperature, sun exposure, weather conditions, and the like; and so on. In some cases, the power line loss can be determined separately for each conductor of a power supply line. In further cases, the power line loss can be determined for multiple discrete power supply lines coupled to the remote load loss compensator, each of which may exhibit different characteristics and, as such, may require different voltage boosts.

Upon determining the power supply line(s) loss(es) at operation 404, the method advances to operation 406 in which an output of a voltage converter (e.g., output voltage) is modified based on a predicted voltage drop that results from the power supply line(s) loss(es) determined at operation 404. For example, if operation 404 determines that resistance of a power supply line will decrease due to a drop in temperature, voltage output from the voltage converter can be reduced. Similarly, if operation 404 determines that the resistance of a power supply line will increase at a particular time of day (e.g., based on historical data or information contained in a database) due to sun exposure, operation 406 can determine, based on a schedule, to increase or decrease voltage output by the voltage converter.

FIG. 5 depicts example operation of a method 500 of power cycling a remote load coupled to a remote load loss compensator, such as described herein. As with the method 400 depicted in FIG. 4, the method 500 can be performed by a controller, such as described herein.

The method 500 includes an operation 502 in which an instruction to power cycle one or more remote loads coupled to the remote load loss compensator is received. The instruction can be received in any suitable form or format, from a local or remote location.

Next at operation 504, the remote load loss compensator can terminate power output from one or more voltage converters conductively coupled to, and feeding power to, one or more remote loads identified by or referenced by the instruction received at operation 502.

Next, at operation 506—after a timeout period that may vary from embodiment to embodiment and that may be specified in the instruction received at operation 502—power output to each of the remote load(s) can be restored.

It may be appreciated that the foregoing description of FIGS. 4-5, and the various alternatives thereof and variations thereto, are presented, generally, for purposes of explanation, and to facilitate a thorough understanding of various possible methods of operating a remote load loss compensator, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

One may appreciate that, although many embodiments are disclosed above, the operations and steps presented with respect to methods and techniques described herein are meant as exemplary and accordingly are not exhaustive. One may further appreciate that alternate step order, or fewer or additional operations, may be required or desired for particular embodiments.

What is claimed is:

1. A cell site comprising:
a power source comprising a first voltage output;
a remote load loss compensator comprising:
  a first voltage input conductively coupled to the first voltage output;
  a voltage converter conductively coupled to the first voltage input and comprising a second voltage output; and
  a controller in communication with the voltage converter;
a power supply line exhibiting a resistance and comprising:
  a second voltage input conductively coupled to the second voltage output; and
  a third voltage output; and
a set of one or more remote radio units conductively coupled to the third voltage output; wherein:
the controller is configured to boost a first voltage received at the first voltage input to a second voltage at the second voltage output by a voltage magnitude selected to compensate for a voltage drop resulting from the resistance of the power supply line; and
the controller is configured to power cycle the set of one or more remote radio units, in response to receiving an instruction to power cycle the one or more remote radio units, and without communicating with the one or more remote radio units, by terminating power output to the power supply line by the voltage converter.

2. The cell site of claim 1, wherein the power source includes one or more of:
a backup battery system; or
a generator system.

3. The cell site of claim 1, wherein the voltage converter comprises a boost converter or a boost-buck converter.

4. The cell site of claim 1, wherein the voltage converter comprises an array of boost converters arranged, at least in part, in a series circuit.

5. The cell site of claim 1, wherein the power supply line is a portion of a hybrid power and communication cable.

6. The cell site of claim 1, further comprising an equipment shelter, wherein the remote load loss compensator is housed within the equipment shelter.

7. The cell site of claim 1, wherein the controller is configured to determine the voltage magnitude based on one or more of:
a gauge of a conductor of the power supply line;
a length of the power supply line;
a conductor type of the power supply line; and
a conductor metal of the power supply line.

8. A remote load loss compensator for installation in an equipment shelter of a cell site, the remote load loss compensator comprising:
an input conductively coupled to a power supply;
a voltage converter conductively coupled to the input and comprising a boosted voltage output configured to feed power to a remote load via a power supply line; and
a controller in communication with the voltage converter and configured to:
  maintain the boosted voltage output at a voltage magnitude selected based on a determined voltage drop resulting from conduction loss in the power supply line; and
  in response to an instruction to power cycle the remote load, power cycle the remote load, without communicating the instruction to the remote load, by terminating the boosted voltage output of the voltage converter.

9. The remote load loss compensator of claim 8, wherein the input has an input voltage having a negative magnitude with respect to a circuit ground.

10. The remote load loss compensator of claim 8, wherein the input has a direct current voltage.

11. The remote load loss compensator of claim 8, wherein the voltage converter comprises an array of boost converters.

12. The remote load loss compensator of claim 8, wherein the controller is configured to determine the voltage drop based on one or more of:
a gauge of a conductor of the power supply line;
a resistance of the power supply line;
a length of the power supply line;
a conductor type of the power supply line; and
a conductor metal of the power supply line.

13. The remote load loss compensator of claim 8, wherein the controller is configured to determine the voltage drop by accessing an electronic file.

14. The remote load loss compensator of claim 8, wherein the controller is configured to maintain the boosted voltage output at the voltage magnitude by controlling a duty cycle of a switching element of the voltage converter.

15. The remote load loss compensator of claim 8, wherein the remote load comprises an array of remote radio units and an array of antennas.

16. A method of operating a remote load loss compensator for installation in an equipment shelter of a cell site, the method comprising:
determining a characteristic of a power supply line conductively coupling the remote load loss compensator and a remote radio unit;
determining a voltage drop across the power supply line based on the characteristic; and
applying a voltage of the remote load loss compensator to the power supply line to feed power to the remote radio unit, the voltage boosted by an amount greater than or equal to the determined voltage drop; and
in response to an instruction to power cycle the remote load, received by the remote load loss compensator, power cycle the remote load by terminating the boosted voltage of the remote load loss compensator for a timeout period.

17. The method of claim 16, wherein the characteristic comprises one of:
a gauge of a conductor of the power supply line;
a resistance of the power supply line;
a length of the power supply line;
a conductor type of the power supply line; and
a conductor metal of the power supply line.

18. The method of claim 16, wherein the voltage is boosted by a boost converter of the remote load loss compensator.

19. The method of claim 16, wherein determining the voltage drop across the power supply line is based on a power requirement of the remote radio unit.

* * * * *